(12) United States Patent
Imakura et al.

(10) Patent No.: US 10,549,513 B2
(45) Date of Patent: Feb. 4, 2020

(54) TRANSFER FILM

(71) Applicant: Dai Nippon Printing Co., Ltd., Tokyo (JP)

(72) Inventors: Yoshihiro Imakura, Tokyo (JP); Ryoji Hattori, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 74 days.

(21) Appl. No.: 15/557,630

(22) PCT Filed: Sep. 27, 2016

(86) PCT No.: PCT/JP2016/078389
§ 371 (c)(1),
(2) Date: Sep. 12, 2017

(87) PCT Pub. No.: WO2017/057328
PCT Pub. Date: Apr. 6, 2017

(65) Prior Publication Data
US 2018/0065345 A1    Mar. 8, 2018

(30) Foreign Application Priority Data

Sep. 28, 2015 (JP) .................................. 2015-190422

(51) Int. Cl.
*B32B 27/16*   (2006.01)
*B44C 1/17*   (2006.01)
(Continued)

(52) U.S. Cl.
CPC .............. *B32B 27/16* (2013.01); *B32B 37/12* (2013.01); *B32B 38/10* (2013.01); *B44C 1/17* (2013.01);
(Continued)

(58) Field of Classification Search
CPC . B32B 38/10; B32B 37/12; B32B 2310/0843; Y10T 428/24843; Y10T 428/24893; Y10T 428/25
See application file for complete search history.

(56) References Cited

U.S. PATENT DOCUMENTS 5,714,305 A   2/1998 Teng et al.
6,344,269 B1  2/2002 Makar et al.
(Continued)

FOREIGN PATENT DOCUMENTS

JP   2003-025745 A1   1/2003
JP   2006-267296 A1   10/2006
(Continued)

OTHER PUBLICATIONS

International Search Report and Written Opinion (Application No. PCT/JP2016/078389) dated Nov. 22, 2016.

*Primary Examiner* — Betelhem Shewareged
(74) *Attorney, Agent, or Firm* — Burr & Brown, PLLC

(57) ABSTRACT

A transfer film of which transfer layer has satisfactory transferability, in which each of layers constituting the transfer layer has satisfactory interlayer adhesiveness, and which can impart very high durability to a print. Specifically, a transfer film in which a transfer layer is provided on a substrate, wherein the transfer layer has a layered structure in which a protective layer, an intermediate layer, and an adhesive layer are layered in this order from the side of the substrate, the protective layer is allowed to contain an active ray-cured resin formed by curing an active ray-curable resin by using an active ray, the intermediate layer is allowed to contain a cured binder resin, which is a cured product of a binder resin and a curing agent, and either one or both of the protective layer and the intermediate layer are allowed to further contain a surfactant.

7 Claims, 1 Drawing Sheet

(51) Int. Cl.
 *B32B 38/10* (2006.01)
 *B32B 37/12* (2006.01)
(52) U.S. Cl.
 CPC .............. *B32B 2310/0843* (2013.01); *Y10T 428/24843* (2015.01); *Y10T 428/24893* (2015.01); *Y10T 428/25* (2015.01)

(56) References Cited

U.S. PATENT DOCUMENTS

| | | | |
|---|---|---|---|
| 2003/0077428 | A1 | 4/2003 | Ishida et al. |
| 2003/0138607 | A1* | 7/2003 | Kuroki ............... B41M 5/38257 428/195.1 |
| 2004/0065403 | A1* | 4/2004 | Hattori .................... B32B 38/10 156/230 |
| 2005/0079341 | A1* | 4/2005 | Masuda .................... B32B 7/06 428/323 |
| 2008/0152875 | A1 | 6/2008 | Tomita et al. |
| 2008/0255297 | A1* | 10/2008 | Itami ...................... C08G 63/08 524/547 |

FOREIGN PATENT DOCUMENTS

| | | |
|---|---|---|
| JP | 2012-076354 A1 | 4/2012 |
| JP | 2012-148484 A1 | 8/2012 |
| JP | 2013-111943 A1 | 6/2013 |

* cited by examiner

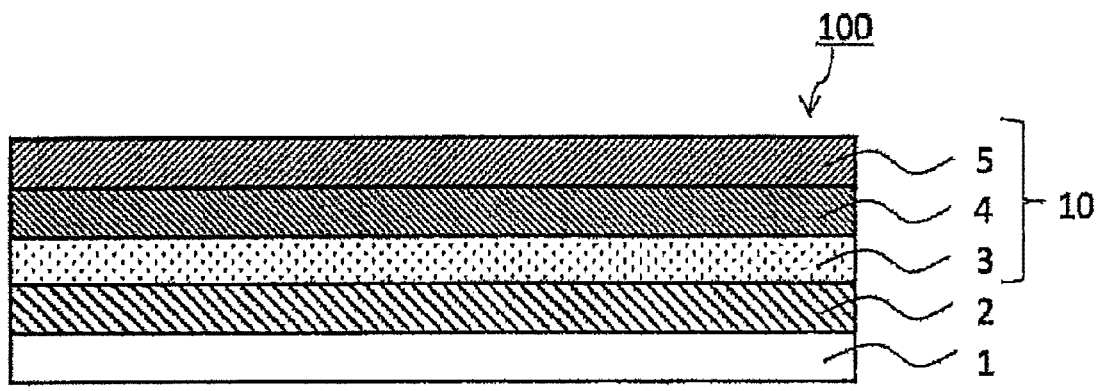

TRANSFER FILM

FIELD OF THE INVENTION

The present invention relates to a transfer film.

BACKGROUND OF THE INVENTION

In order to impart durability to the surface of ID cards such as identification paper and IC cards such as bank cards (hereinbelow, these are collectively referred to as cards), an attempt to transfer a transfer layer onto the surface of such cards has been conventionally made by using a transfer film comprising a substrate and a transfer layer including a protective layer provided peelably from the substrate (the film may also be referred to as a protective layer transfer sheet.).

As a transfer film, a transfer film comprising a transfer layer in which a protective layer and a layer functioned both as a receiving layer and an adhesive layer are layered in this order from the substrate side (the film may also be referred to as an intermediate transfer medium.) is also known, as proposed in Patent Literature 1. For such transfer films, high transferability is required without causing defective transfer such as tailing and burrs when the transfer layer is transferred. According to the transfer film proposed in Patent Literature 1, it is said that formation of the protective layer by using a urethane-modified acrylate as an ionizing radiation-curable resin may lead to an improvement in the foil cutting on transfer and the durability of the protective layer. However, the transfer film proposed in Patent Literature 1 cannot be said to have sufficient transferability of the transfer layer and sufficient adhesiveness between the protective layer and the adhesive layer, and there is left room for improvements in this respect.

CITATION LIST

Patent Literature

Patent Literature 1: Japanese Patent Laid-Open No. 2003-25745

SUMMARY OF INVENTION

Technical Problem

The present invention has been made in view of the above-mentioned circumstances, and the present invention aims principally to provide a transfer film in which a transfer layer has high transferability and which can provide a print having excellent durability by transfer of the transfer layer.

Solution to Problem

The present invention for solving the above problems is a transfer film in which a transfer layer is provided on a substrate, wherein the transfer layer has a layered structure in which a protective layer, an intermediate layer, and an adhesive layer are layered in this order from the side of the substrate, the protective layer contains an active ray-cured resin formed by curing an active ray-curable resin by an active ray, the intermediate layer contains a cured binder resin, which is a cured product of a binder resin and a curing agent, and either one or both of the protective layer and the intermediate layer further contain a surfactant.

Alternatively, both of the protective layer and the intermediate layer may contain the surfactant. The surfactant may be an acryl type surfactant.

A release layer also may be provided between the substrate and the transfer layer.

The cured binder resin contained in the intermediate layer may be a cured product of a binder resin and an isocyanate type compound.

The protective layer may also contain a filler having a volume-average particle size of 1 nm or more and 200 nm or less.

The adhesive layer may be an adhesive layer having the function of a receiving layer.

Advantageous Effect of Invention

According to the present invention, it is possible to make the transferability of the transfer layer satisfactory and to impart very high durability to a print onto which the transfer layer has been transferred.

BRIEF DESCRIPTION OF DRAWING

FIG. 1 is a cross-sectional schematic view of a transfer film according to one embodiment of the present invention.

DETAILED DESCRIPTION OF THE INVENTION

<<Transfer Film>>

A transfer film 100 of one embodiment of the present invention (wherein below, the film is referred to as the transfer film of one embodiment) will be described herein below, with reference to the drawing. As shown in FIG. 1, the transfer film 100 of one embodiment comprises a substrate 1 and a transfer layer 10 provided on the substrate 1. The transfer layer 10 has a layered structure in which a protective layer 3, an intermediate layer 4, and an adhesive layer 5 are layered in this order from the side of the substrate 1. Incidentally, in the aspect shown in FIG. 1, a release layer 2 is provided between the substrate 1 and the transfer layer 10, but the release layer 2 is an optional constituent in the transfer film 100 of one embodiment.

The transfer film 100 of one embodiment is a transfer film used to transfer the transfer layer 10 onto an optional object (hereinbelow the object is referred to as a transfer receiving article) to thereby obtain a print having high durability. There is no limitation with respect to transfer receiving articles, and examples include card substrates such as IC cards and ID cards and thermal transfer image-receiving sheets where a thermally transferable image has been formed. As a transfer receiving article, things other than these can also be used.

(Substrate)

The substrate 1 is an essential constituent in the transfer film 100 of one embodiment and has the transfer layer 10 provided on one surface of the substrate 1 or an optional layer provided between the substrate 1 and the transfer layer 10 (e.g., the release layer 2). There is no particular limitation with respect to the materials of the substrate 1, and it is preferred for the materials to have heat resistance sufficient to endure the thermal energy when the transfer layer 10 is transferred onto a transfer receiving article (e.g., the heat of a thermal head) and to have mechanical strength sufficient to support the transfer layer 10 and solvent resistance. Examples of such materials of the substrate 1 can include polyester type resins such as polyethylene terephthalate, polybutylene terephthalate, polyethylene naphthalate, polyethylene terephthalate-isophthalate copolymers, terephthalic acid-cyclohexanedimethanol-ethylene glycol copolymers, and polyethylene terephthalate/polyethylene naphthalate coextruded films, polyamide type resins such as nylon 6 and nylon 66, polyolefin type resins such as polyethylene, polypropylene, and polymethylpentene, vinyl type resins such as polyvinyl chloride, acryl type resins such as polyacrylate, polymethacrylate, and polymethyl methacrylate, imide type resins such as polyimide and polyether imide, engineering resins such as polyarylate, polysulfone, polyether sulfone, polyphenylene ether, polyphenylene sulfide (PPS), polyaramid, polyether ketone, polyether nitrile, polyether ether ketone, and polyether sulfite, polycarbonate, styrene type resins such as polystyrene, high impact polystyrene, acrylonitrile-styrene copolymers (AS resins), and acrylonitrile-butadiene-styrene copolymers (ABS resins), and cellulose type films such as cellophane, cellulose acetate, and nitrocellulose.

The substrate 1 may be a copolymer resin mainly based on a resin exemplified above or a mixed product (including an alloy), or a laminate composed of a plurality of layers. The substrate also may be a stretched film or an unstretched film. For the purpose of improving the strength, films stretched in a uniaxial direction or biaxial direction are preferably used. The substrate 1 is used in the form of a film, sheet or board composed of at least one layer of these resins. Among the substrates composed of the resins exemplified above, polyester type films such as polyethylene terephthalate and polyethylene naphthalate are suitably used due to their excellent thermal resistance and mechanical strength. Among these, polyethylene terephthalate films are more preferable.

For preventing blocking, it is possible to impart asperities to the substrate surface as required. Examples of procedures to form asperities on the substrate include matting agent-kneading processing, sand blast processing, hairline processing, matte coating processing, and chemical etching processing. The matting agent-kneading processing is a processing method for forming a substrate from a resin into which an inorganic material or an organic material is kneaded. The matte coating processing is a processing method for imparting asperities to a substrate surface by coating the substrate surface with a coating agent containing an organic material or an inorganic material.

There is no particular limitation with respect to the thickness of the substrate 1, and the thickness is preferably in the range of 0.5 µm or more and 50 µm or less, more preferably in the range of 4 µm or more and 20 µm or less. By setting the thickness of the substrate 1 within this range, it is possible to sufficiently transmit the thermal energy when the transfer layer 10 is transferred from the transfer film 100 to the transfer layer side and to make a further improvement in the transferability. It is also possible to increase the mechanical strength of the substrate 1 and to sufficiently support the transfer layer 10.

The surface of the side to be opposed to the transfer layer 10 of the substrate 1 may be subjected to easily-adhesive treatment, in advance, such as corona discharge treatment, plasma treatment, ozone treatment, flame treatment, primer (also referred to as an anchor coat, an adhesion promoter, or an easy-adhesion agent) coating treatment, preheating treatment, dust removing treatment, vapor deposition treatment, alkaline treatment, and addition of an antistatic layer. Additives such as a filling agent, a plasticizer, a colorant, and an antistatic agent may be also added to the substrate as required.

(Transfer Layer)

As shown in FIG. 1, the transfer layer 10 is provided on the substrate 1 (in the aspect shown, the optional release layer 2). The transfer layer 10 is provided peelably from the substrate 1 and is a layer moving onto a transfer receiving article when thermally transferred. The transfer layer 10 has a layered structure in which the protective layer 3, the intermediate layer 4, and the adhesive layer 5 are layered in this order from the side of the substrate 1. The protective layer 3, the intermediate layer 4, and the adhesive layer 5 are essential constituents in the transfer film 100 of one embodiment.

(Protective Layer)

The protective layer 3 included in the transfer layer 10 is a layer for imparting durability to a print obtained by transferring the transfer layer 10 onto a transfer receiving article. Incidentally, the protective layer 3 is located nearest of the layers constituting the transfer layer 10 from the substrate 1 and is a layer located on the outermost surface in a print obtained by transferring the transfer layer 10 onto the transfer receiving article.

The protective layer 3 for imparting durability to a print contains an active ray-cured resin formed by curing an active ray-curable resin by an active ray, that is, an active ray-cured resin obtained by irradiating an active ray-curable resin with an active ray, in other words, an active ray-cured resin which is a reaction product of an active ray-curable resin and an active ray (hereinbelow, an active ray-cured resin formed by curing an active ray-curable resin by an active ray is referred to as an active ray-cured resin). Incidentally, the active ray-curable resin referred to in the specification of the present application means a precursor or a composition before irradiated with an active ray. The active ray referred to in the specification of the present application means a radioactive ray which is allowed to chemically act on an active ray-curable resin to promote polymerization. Specific examples include visible light rays, ultraviolet rays, X rays, electron beams, a rays, p rays, and y rays.

According to the protective layer 3 containing an active ray-cured resin, it is possible to impart very high durability to a print obtained by transferring the transfer layer 10 onto a transfer receiving article. Incidentally, besides physical durability such as abrasion resistance, chemical durability such as solvent resistance and plasticizer resistance is included in the durability referred to herein. In other words, according to the transfer film 100 of one embodiment, it is possible to obtain a print excellent both in physical durability and chemical durability by transferring the transfer layer 10 onto a transfer receiving article.

The transferability of the transfer layer referred to in the specification of the present application is an index indicating whether the transfer layer can be accurately transferred (move) onto the transfer receiving article side such that the transfer layer does not remain on the substrate side when the transfer layer is transferred onto a transfer receiving article. That the transferability is high means that, when the transfer layer is transferred onto a transfer receiving article by applying energy on the transfer film, the transfer layer can accurately move onto the transfer receiving article such that the transfer layer corresponding to the region to which the energy has been applied does not remain on the substrate side. Meanwhile, that the transferability is low means that, when the transfer layer is transferred onto a transfer receiving article by applying energy to the transfer film, in a portion of the transfer layer corresponding to the region to which energy has been applied or the entire region, the substrate or a layer optionally provided on the substrate (e.g., an optional release layer described later) and the protective layer constituting the transfer layer 10 cause thermal fusion bonding and the like and thus the transfer layer does not move onto the transfer receiving article side and remains on the substrate side.

Subsequently, the active ray-curable resin will be described. The active ray-curable resin as an example comprises, as polymerization components, a composition and the like prepared by appropriately mixing a polymer, a prepolymer, an oligomer and/or a monomer having a polymerizable unsaturated bond such as a (meth) acryloyl group and a (meth) acryloyloxy group or an epoxy group in the molecule.

The active ray-curable resin as an example also comprises a urethane (meth) acrylate as a polymerization component. As the urethane (meth) acrylate, a polyfunctional urethane (meth) acrylate is preferably comprised. As the polyfunctional urethane (meth) acrylate, a urethane (meth) acrylate having 5 or more and 15 or less functional groups is preferable, and a urethane (meth) acrylate having 6 or more and 15 or less functional groups is more preferable. By forming the protective layer 3 using an active ray-curable resin in which the urethane (meth) acrylate has functional groups within the above numerical range, it is possible to make a further improvement in the physical durability and the chemical durability. Incidentally, in the specification of the present application, a urethane (meth) acrylate having 5 or more functional groups is referred to as a polyfunctional urethane (meth) acrylate.

The protective layer 3 contains a polyfunctional urethane (meth) acrylate preferably in the range of 5% by mass or more and 80% by mass or less, more preferably in the range of 10% by mass or more and 50% by mass or less on the basis of the total solid content of the protective layer 3.

From the viewpoint of combining the solvent resistance and the bendability of the protective layer, the protective layer 3 preferably contains either one or both of a urethane (meth) acrylate having 2 or more and 4 or less functional groups and a (meth) acrylate having 2 or more and 5 or less functional groups, together with the above polyfunctional urethane (meth) acrylate. Alternatively, the protective layer 3 contains either one or both of a urethane (meth) acrylate having 2 or more and 4 or less functional groups and a (meth) acrylate having 2 or more and 5 or less functional groups preferably in the range of 5% by mass or more and 80% by mass or less, more preferably in the range of 10% by mass or more and 70% by mass or less, on the basis of the total solid content of the protective layer 3.

Additionally, the mass average molecular weight (Mw) of both of the polyfunctional urethane (meth) acrylate and the urethane (meth) acrylate having 2 or more and 4 or less functional groups is preferably in the range of 400 or more and 20000 or less, more preferably in the range of 500 or more and 10000 or less. When the mass average molecular weight (Mw) of the urethane (meth) acrylate is within the above numerical range, it is possible to improve the abrasion resistance. For a similar reason, the mass average molecular weight (Mw) of the (meth) acrylate having 2 or more and 5 or less functional groups is preferably in the range of 200 or more and 5000 or less. Incidentally, the "mass average molecular weight" in the specification of the present application means a value measured by gel permeation chromatography using polystyrene as a standard substance and can be measured by a methods in compliance with JIS-K-7252-1 (2008).

The protective layer 3 may also comprise an unsaturated bond-containing (meth) acryl type copolymer as a polymerization component. Examples of the unsaturated bond-containing (meth) acryl type copolymer include polyester (meth) acrylate, epoxy (meth) acrylate, melamine (meth) acrylate, and triazine (meth) acrylate.

The acid value of the unsaturated bond-containing (meth) acryl type copolymer is preferably in the range of 5 mgKOH/g or more and 500 mgKOH/g or less, more preferably in the range of 10 mgKOH/g or more and 150 mgKOH/g or less. By using a polymerizable unsaturated bond-containing (meth) acryl type copolymer having an acid value in the above range, the adhesiveness to the intermediate layer 4 described later is improved as well as a transfer layer 10 having high surface strength can be obtained. Incidentally, the "acid value" referred in the specification of the present application means the amount of potassium hydroxide in milligrams that is required to neutralize free fatty acid contained in 1 g of a polymer and can be measured by a method in compliance with JIS-K-2501. The acid value of a polymer can be adjusted as appropriate by adjusting the ratio of monomer components constituting the polymer.

The mass average molecular weight (Mw) of the unsaturated bond-containing (meth) acryl type copolymer is preferably in the range of 3000 or more and 100000 or less, more preferably in the range of 10000 or more and 80000 or less. By setting the mass average molecular weight (Mw) within this range, it is possible to make a further improvement in the chemical durability such as thermal resistance and chemical resistance and the physical durability such as scratch resistance. Additionally, by setting the mass average molecular weight (Mw) within this range, it is possible to prevent gelling reaction during preservation of a coating liquid for forming a protective layer from occurring and to improve the preservation stability of the coating liquid.

The unsaturated bond-containing (meth) acryl type copolymer described above is contained in an active ray-curable resin preferably in the range of 10% by mass or more and 80% by mass or less, more preferably in the range of 20% by mass or more and 70% by mass or less, still more preferably in the range of 20% by mass or more and 50% by mass or less.

The active ray-curable resin may also comprise, as a polymerization component, in addition to the unsaturated bond-containing (meth) acryl type copolymer, an oligomer and/or monomer of (meth) acrylic acid, styrene, vinyl acetate, hydroxyethyl vinyl ether, ethylene glycol divinyl ether, pentaerythritol trivinyl ether, (meth) acrylamide, N-hydroxymethyl (meth) acrylamide, N-vinylformamide, acrylonitrile or the like. The active ray-curable resin may also comprise a prepolymer, oligomer and/or monomer as follows.

Examples of the prepolymer include polyester (meth) acrylates obtained by introducing (meth) acrylic acid into a polyester obtained by bonding a polybasic acid such as adipic acid, trimellitic acid, maleic acid, phthalic acid, terephthalic acid, himic acid, malonic acid, succinic acid, glutaric acid, itaconic acid, pyromellitic acid, fumaric acid, glutaric acid, pimelic acid, sebacic acid, dodecanoic acid, and tetrahydrophthalic acid with a polyhydric alcohol such as ethylene glycol, propylene glycol, diethylene glycol, propylene oxide, 1,4-butanediol, triethylene glycol, tetraethylene glycol, polyethylene glycol, glycerin, trimethylolpropane, pentaerythritol, sorbitol, 1,6-hexanediol, and 1,2,6-hexanetriol; epoxy (meth) acrylates obtained by introducing (meth) acrylic acid into an epoxy resin such as bisphenol A-epichlorohydrin-(meth) acrylic acid, phenol novolacepichlorohydrin-(meth) acrylic acid; urethane (meth) acrylates obtained by introducing (meth) acrylic acid into a urethane resin such as ethylene glycol-adipic acid-tolylene diisocyanate-2-hydroxyethyl acrylate, polyethylene glycol-tolylene diisocyanate-2-hydroxyethyl acrylate, hydroxyethyl phthalyl methacrylate-xylene diisocyanate, 1,2-polybutadiene glycol-tolylene diisocyanate-2-hydroxyethyl acrylate, trimethyloipropane-propylene glycol-tolylene diisocyanate-2-hydroxyethyl acrylate; silicone resin acrylates such as polysiloxane (meth) acrylate and polysiloxane-diisocyanate-2-hydroxyethyl (meth) acrylate, and additionally, alkyd-modified (meth) acrylates obtained by introducing a (meth) acryloyl group into an oil-modified alkyd resin, and spiran resin acrylates.

Examples of the monomer or oligomer include monofunctional acrylic acid esters such as 2-ethylhexyl acrylate, 2-hydroxypropyl acrylate, glycerol acrylate, tetrahydrofurfuryl acrylate, phenoxyethyl acrylate, nonylphenoxyethyl acrylate, tetrahydrofurfuryloxyethyl acrylate, tetrahydrofurfuryloxyhexanolide acrylate, acrylates of ε-caprolactone adducts of 1,3-dioxane alcohol, and 1,3-dioxolane acrylate; or methacrylic acid, itaconic acid, crotonic acid, or maleic acid esters obtained by replacing their acrylate by methacrylate, itaconate, crotonate, or maleate; bifunctional acrylic acid esters such as ethylene glycol diacrylate, triethylene glycol diacrylate, pentaerythritol diacrylate, hydroquinone diacrylate, resorcin diacrylate, hexanediol diacrylate, neopentyl glycol diacrylate, tripropylene glycol diacrylate, diacrylate of neopentyl hydroxypivalate glycol, diacrylate of neopentyl glycol adipate, diacrylates of ε-caprolactone adducts of neopentyl hydroxypivalate glycol, 2-(2-hydroxy-1,1-dimetylethyl)-5-hydroxymethyl-5-ethyl-1,3-dioxane diacrylate, tricyclodecanedimethylol acrylate, ε-caprolactone adducts of tricyclodecanedimethylol acrylate, and diacrylate of diglycidyl ether of 1,6-hexanediol; or methacrylic acid, itaconic acid, crotonic acid, or maleic acid esters obtained by replacing their acrylate by methacrylate, itaconate, crotonate, or maleate; polyfunctional acrylic acid esters such as trimethylolpropane triacrylate, ditrimethylolpropane tetraacrylate, trimethylolethane triacrylate, pentaerythritol triacrylate, pentaerythritol tetraacrylate, dipentaerythritol tetraacrylate, dipentaerythritol pentaacrylate, dipentaerythritol hexaacrylate, ε-caprolactone adducts of dipentaerythritol hexaacrylate, pyrogallol triacrylate, propionic acid-dipentaerythritol triacrylate, propionic acid-dipentaerythritol tetraacrylate, and hydroxypivalyl aldehyde-modified dimethylolpropane triacrylate; or methacrylic acid, itaconic acid, crotonic acid, or maleic acid esters obtained by replacing their acrylate by methacrylate, itaconate, crotonate, or maleate; phosphazene monomers, triethylene glycol, EO-modified isocyanurate diacrylate, EO-modified isocyanurate triacrylate, dimethyloltricyclodecane diacrylate, trimethylolpropane acrylic acid benzoic acid esters, and alkylene glycol type acrylic acid-modified and urethane-modified acrylates.

There is no particular limitation with respect to the content of the active ray-cured resin, and in the case where a further improvement of the durability is intended, the content of the active ray-cured resin is preferably 30% by mass or more, more preferably 50% by mass or more, on the basis of the total mass of the protective layer 3. The upper limit is not particularly limited and can be set as appropriate depending on components to be added optionally and the like. An example is 100% by mass.

The protective layer 3 may also contain other resin together with the active ray-cured resin. Other resin may be one cured with a curing agent or the like or uncured one.

In the transfer film 100 of one embodiment, the protective layer 3 constituting the transfer layer 10 contains an active ray-cured resin, and the transferability of the transfer layer 10 and the durability of a print obtained by transferring the transfer layer 10 have been improved by means of the action of this protective layer 3. By the way, while the protective layer 3 containing an active ray-cured resin has an advantage of enabling improvements in the durability of a print and the transferability when the transfer layer 10 is transferred as described above, the protective layer 3 has a property of being likely to degrade the quality of the surface of a layer to be provided on the protective layer 3. As described later, the intermediate layer 4 is provided on the protective layer 3 in order to improve the interlayer adhesiveness of the transfer layer 10. However, in the case where, in the protective layer or the intermediate layer, no measure is taken to improve the quality of the surface of the intermediate layer, the quality of the surface of the intermediate layer to be provided on the protective layer is degraded to thereby lead to reduction in the designability of a print obtained by transferring the transfer layer.

Then, the transfer film 100 of one embodiment is characterized in that either one or both of the protective layer 3 and the intermediate layer 4 described later contain a surfactant. According to the transfer film 100 of one embodiment having this characteristic, it is possible to make an improvement in the quality of the surface of the intermediate layer 4 to be provided on the protective layer 3 containing an active ray-cured resin. The measure to improve the quality of the surface of the intermediate layer 4 may be taken in the side of the protective layer 3 or in the side of the intermediate layer 4. Specifically, the protective layer 3 may be allowed to contain a surfactant, or the intermediate layer 4 may be allowed to contain a surfactant. Alternatively, the measure to improve the quality of the surface of the intermediate layer 4 may be taken both in the side of the protective layer 3 and in the side of the intermediate layer 4. In other words, both of the protective layer 3 and the intermediate layer 4 may be allowed to contain a surfactant. By taking an aspect where both of the protective layer 3 and the intermediate layer 4 are allowed to contain a surfactant, it is possible to make a further improvement in the quality of the surface of the intermediate layer 4 to be provided on the protective layer 3. Hereinbelow, the surfactant will be described.

<Surfactant>

There is no particular limitation with respect to the surfactant contained in either one or both of the protective layer 3 and the intermediate layer 4, and conventionally-known surfactants can be appropriately selected and used. Examples of the surfactant include anionic surfactants, nonionic surfactants, cationic surfactants, amphoteric surfactants, vinyl-based surfactants, fluorine-based surfactants, silicone-based surfactants, and acryl type surfactants.

Among these surfactants, nonionic surfactants, vinyl-based surfactants, silicone-based surfactants, and acryl type surfactants are suitable as a surfactant contained in either one or both of the protective layer 3 and the intermediate layer 4, from the viewpoint of being able to make a further improvement in the quality of the surface of the intermediate layer 4 to be provided on the protective layer 3 containing an active ray-cured resin. Among these, acryl type surfactants are preferable. Particularly preferably, both of the protective layer 3 and the intermediate layer 4 contain a surfactant, and at the same time, at least one surfactant of the surfactants contained in the protective layer 3 and the intermediate layer 4 is an acryl type surfactant. Most preferably, both of the protective layer 3 and the intermediate layer 4 contain an acryl type surfactant as the surfactant.

Anionic surfactants are surfactants which dissociate into ions in an aqueous solution and then in which the anionic portion has surface activity. Examples can include carboxylates, sulphonates, and phosphates.

Nonionic surfactants are surfactants having no group that dissociates into ions in an aqueous solution. Examples can include fluorine-containing group-hydrophilic group-containing oligomers, fluorine-containing group-lipophilic group-containing oligomers, fluorine-containing group-hydrophilic group-lipophilic group-containing oligomers, polyoxyalkylene alkyl ethers, polyoxyalkylene alkylphenol ethers, polyoxyalkylene aryl ethers, polyoxyalkylene alkylaryl ethers, sorbitan derivatives, formalin condensates of polyoxyalkylene aryl ethers, and formalin condensates of polyoxyalkylene alkylaryl ethers.

Cationic surfactants are surfactants in which a moiety that dissociates into ions in an aqueous solution to become cations exhibits surface activity, and are, for example, aliphatic amine salts and their quaternary ammonium salts, aromatic quaternary ammonium salts, and heterocyclic quaternary ammonium salts. Examples of the cationic surfactant can include monoalkyl amine salts, dialkyl amine salts, trialkyl amine salts, aliphatic quaternary ammonium salts, halogenated benzethonium, pyridium salts, and imidazolium salts.

Amphoteric surfactants are surfactants having both a cationic group and an anionic group in the molecular structure, and examples can include N-alkylnitrilotriacetic acid, N-alkyldimethyl betaine, N-alkyloxymethyl-N,N-diethylbetaine, N-alkylsulfobetaine, N-alkylhydroxysulfobetaine, lecitin, and perfluoroalkyl sulfoneamide alkylbetaine.

Vinyl-based surfactants mean surfactants containing a polymer obtained from vinyl monomers. An example of a commercially available vinyl-based surfactant can include Kusumoto Chemicals, Ltd., trade name: LHP-90. Also as vinyl-based surfactants, surfactants containing a polymer obtained from vinyl monomers and silicone can be used.

Fluorine-based surfactants mean surfactants containing fluorine. Fluorine-based surfactants are usually surfactants obtained by substituting all or a portion of hydrogen atoms of the hydrophobic groups of a hydrocarbon-based surfactant with fluorine atoms.

Silicone-based surfactants mean surfactants having an organosiloxane structure in the molecular structure. An example of a commercially available silicone-based surfactant can include Kusumoto Chemicals, Ltd., trade name: 1711EF.

Acryl type surfactants mean surfactants containing a polymer obtained from acryl monomers. An example of a commercially available acryl type surfactant can include Kusumoto Chemicals, Ltd., trade name: LF1984.

The protective layer 3 may contain one of the surfactants or may contain two or more of the surfactants.

There is no particular limitation with respect to the content of the surfactant, and it is possible to improve the quality of the surface of the intermediate layer 4 to be provided on the protective layer 3 by the amount of the surfactant contained, irrespective of the content. Incidentally, the content of the surfactant is preferably in the range of 0.01% by mass or more and 5% by mass or less, more preferably in the range of 0.05% by mass or more and 3% by mass or less on the basis of the total mass of the protective layer 3. By setting the content of the surfactant within this range, it is possible to further enhance the effect of improving the quality of the surface. Additionally, it is possible to make a further improvement in the adhesiveness between the protective layer 3 and the intermediate layer 4. The case where the intermediate layer 4 contains a surfactant will be described later.

The protective layer 3 may contain other components in addition to the active ray-cured resin, and the surfactant to be contained as required. Examples of the other components include a filler. By allowing the protective layer 3 to contain a filler, it is possible to improve the foil cutting property of the transfer layer 10.

Examples of the filler can include organic fillers, inorganic fillers, and fillers of organic-inorganic hybrid type. The filler may also be in a powder or a sol form, but powder fillers are preferably used because of their wide solvent-selectivity when a coating liquid for a protective layer is prepared.

The filler contained in the protective layer 3 is preferably a filler having a volume-average particle size of 1 nm or more and 200 nm or less, more preferably a filler having a volume-average particle size of 1 nm or more and 50 nm or less, still more preferably a filler having a volume-average particle size of 7 nm or more and 25 nm or less. By allowing the protective layer 3 to contain a filler having a volume-average particle size within the range described above, it is possible to make a further improvement in the transferability. Incidentally, the "volume-average particle size" means a volume-average particle size measured in compliance with JIS-Z-8819-2 (2001) and can be measured by using a grain size distribution/particle size distribution analyzer (Nanotrac grain size distribution analyzer, NIKKISO CO., LTD.) in accordance with a known method.

Examples of the powder organic filler can include acryl type particles such as uncrosslinked acryl type particles and crosslinked acryl type particles, polyamide type particles, fluorine type particles, and polyethylene wax. Examples of the powder inorganic filler can include calcium carbonate particles, silica particles, and metal oxide particles such as titanium oxide. Examples of the filler of organic-inorganic hybrid type include ones prepared by hybridizing an acryl resin with silica particles. Additionally, examples of the filler in the sol form can include silica sol types and organosol types. One of these fillers may be used solely, or two or more of these may be mixed and used.

The filler described above is contained in the protective layer 3 preferably in the range of 3% by mass or more and 60% by mass or less, more preferably in the range of 3% by mass or more and 45% by mass or less, still more preferably in the range of 3% by mass or more and 40% by mass or less.

There is no particular limitation with respect to the thickness of the protective layer 3, and the thickness is preferably 1 μm or more and 8 μm or less, more preferably 2 μm or more and 6 μm or less. By setting the thickness of the protective layer 3 within this range, it is possible to make a further improvement in the foil cutting property, and it is also possible to improve the effect of preventing defective transfer such as tailing and burrs. Additionally, it is possible to make a further improvement in the physical durability and the chemical durability imparted to a print obtained by transferring the transfer layer 10 onto a transfer receiving article. Furthermore, it is also possible to prevent defective transfer such as paper peeling and chipping from occurring when the transfer layer 10 is transferred.

There is no particular limitation with respect to the method for forming the protective layer 3, and the protective layer 3 can be formed by forming a coated layer by coating the substrate 1 or an optional layer to be provided on the substrate 1 (e.g., the release layer 2) with a coating liquid composed of a composition including an active ray-curable resin, a surfactant used as required, and optional components by a known procedure such as roll coating, reverse roll coating, gravure coating, reverse gravure coating, bar coating, and rod coating, and crosslinking and curing polymerization components described above such as polymerizable copolymers by an active ray. For example, a conventionally-known ultraviolet irradiation apparatus can be used for ultraviolet irradiation. Various apparatuses such as high pressure mercury lamps, low pressure mercury lamps, carbon arcs, xenon arcs, metal halide lamps, non-electrode ultraviolet lamps, and LEDs can be used without limitation. Alternatively, for electron beam irradiation, either of a high energy-type electron beam irradiation apparatus that applies an electronic beam at an energy of 100 keV to 300 keV or a low energy-type electron beam irradiation apparatus that applies an electronic beam at an energy of 100 keV or less may be used. In terms of the irradiation mode, either of a scanning-type irradiation apparatus or a curtain-type irradiation apparatus may be used.

(Intermediate Layer)

The protective layer 3 described above has a property of remarkably excellent durability, but has a property of low adhesiveness to the adhesive layer 5. Accordingly, in the case where the adhesive layer 5 is provided directly on the protective layer 3 containing an active ray-cured resin, it is not possible to sufficiently increase the adhesiveness between the protective layer 3 and the adhesive layer 5, and after the protective layer 3 is transferred onto a transfer receiving article, a problem of falling-off of the protective layer 3 from the transfer receiving article tends to occur. A problem also tends to occur that the protective layer and the adhesive layer are separated when the transfer layer is transferred and only the adhesive layer is transferred onto the transfer receiving article.

The transfer film 100 of one embodiment for which such a point is considered has an intermediate layer 4 provided between the protective layer 3 and the adhesive layer 5, as shown in FIG. 1, and is characterized in that this intermediate layer 4 contains a cured binder resin, which is a cured product of a binder resin and a curing agent, in other words, a cured resin obtained by allowing a curing agent to act on a binder resin, that is, a cured resin obtained by allowing a curing agent to cure a binder resin (hereinbelow, a cured resin obtained by allowing a curing agent to act on a binder resin is referred to as a cured binder resin). By providing the intermediate layer 4 containing a cured binder resin between the protective layer 3 and the adhesive layer 5, it is possible to make the interlayer adhesiveness of each of the layers constituting the transfer layer 10 very satisfactory. Specifically, it is possible to increase the adhesiveness between the protective layer 3 and the intermediate layer 4 and the adhesiveness between the intermediate layer 4 and the adhesive layer 5, and, as a result, it is possible to improve the interlayer adhesiveness of each of the layers constituting the transfer layer 10 as a whole.

There is no particular limitation with respect to the binder resin for obtaining a cured binder resin, and for example, conventionally-known thermoplastic resins can be appropriately selected and used. Examples of such resins can include polyester resins, polyurethane resins, acryl resins, polycarbonate resins, polyvinyl alcohol resins, vinyl chloride-vinyl acetate copolymers, and polyvinyl butyral resins. Among them, polyester resins and vinyl chloride-vinyl acetate copolymers are preferable, and use of a polyester resin and a vinyl chloride-vinyl acetate copolymer in combination is more preferable. In the case where a polyester resin and a vinyl chloride-vinyl acetate copolymer are used in combination, the mass of the polyester resin is preferably in the range of 2% by mass or more and 97% by mass or less, more preferably in the range of 3% by mass or more and 96% by mass or less, still more preferably in the range of 16% by mass or more and 94% by mass or less, most preferably in the range of 33% by mass or more and 86% by mass or less on the basis of the total mass of the polyester resin and the vinyl chloride-vinyl acetate copolymer. In other words, the blend ratio between the polyester resin and the vinyl chloride-vinyl acetate copolymer is preferably 1:40 to 30:1, more preferably 1:30 to 20:1, still more preferably 1:5 to 15:1, most preferably 1:2 to 6:1 based on the mass.

There is also no particular limitation with respect to the curing agent for obtaining a cured binder resin, and for example, isocyanate compounds, and metal chelating agents such as titanium chelating agents, zirconium chelating agents, and aluminum chelating agents can be appropriately selected and used. Among these, as the curing agent for obtaining a cured binder resin, isocyanate compounds are suitable. By using a cured product of a binder resin and an isocyanate compound as a cured binder resin to be contained in the intermediate layer 4, it is possible to make a further improvement in the interlayer adhesiveness of each of the layers constituting the transfer layer 10.

As the isocyanate compound, polyisocyanate compounds having two or more isocyanate groups in the molecule are preferable. Examples can include xylene diisocyanate, para-phenylene diisocyanate, 1-chloro-2,4-phenyl diisocyanate, 2-chloro-1,4-phenyl diisocyanate, 2,4-toluene diisocyanate, 2,6-toluene diisocyanate, 1,5-naphthalene diisocyanate, tolidine diisocyanate, p-phenylene diisocyanate, trans-cyclohexane, 1,4-diisocyanate, hexamethylene diisocyanate, 4,4'-biphenylene diisocyanate, triphenylmethane triisocyanate, and 4,4',4"-trimethyl-3,3',2'-triisocyanate-2,4,6-triphenyl cyanurate.

In the case where an isocyanate compound is used as the curing agent, the content of the isocyanate compound is preferably in the range of 0.05% by mass or more and 5% by mass or less, more preferably in the range of 0.05% by mass or more and 2% by mass or less, still more preferably in the range of 0.1% by mass or more and 1% by mass or less on the basis of the total mass of the resin composition for forming the intermediate layer 4. The content of the thermoplastic resin is preferably in the range of 10% by mass or more and 50% by mass or less, more preferably in the range of 20% by mass or more and 40% by mass or less, still more preferably in the range of 25% by mass or more and 35% by mass or less. According to the intermediate layer 4 formed from the resin composition like this, it is possible to make a further improvement in the interlayer adhesiveness of each of the layers constituting the transfer layer 10.

The intermediate layer 4 may contain a resin other than the cured binder resin described above.

The case where the protective layer 3 contains a surfactant has been described as an example hereinabove, but in the case where the protective layer 3 contains no surfactant, the intermediate layer 4 contains a surfactant. As for the surfactant, ones described in the protective layer 3 above can be used as they are, and a detailed description is omitted here. Also by allowing the intermediate layer 4 to contain a surfactant without allowing the protective layer 3 to contain a surfactant, it is possible to make an improvement in the quality of the surface of the intermediate layer 4. That is, a measure to make an improvement in the quality of the surface of intermediate layer 4 can be taken on the side of the intermediate layer 4.

In the case where the intermediate layer 4 is allowed to contain a surfactant without allowing the protective layer 3 to contain a surfactant, the content of the surfactant is preferably in the range of 0.01% by mass or more and 5% by mass or less, more preferably in the range of 0.05% by mass or more and 3% by mass or less on the basis of the total mass of the intermediate layer 4.

Alternatively, both of the protective layer 3 and the intermediate layer 4 can be allowed to contain a surfactant. In this case, it is possible to make an improvement in the quality of the surface of the intermediate layer 4 while the amount of the surfactant to be contained in each layer is reduced, compared with the case where either of the protective layer 3 or the intermediate layer 4 solely contains a surfactant. Thereby, by reducing the amount of surfactant to be contained in each layer, it is possible to allow the protective layer 3 and the intermediate layer 4 to contain a larger amount of the components other than the surfactant corresponding to the amount reduced, and it also possible to improve the durability and the interlayer adhesiveness of each of the layers constituting the transfer layer 10. The total mass of surfactants in the case where both of the protective layer 3 and the intermediate layer 4 are allowed to contain a surfactant is preferably in the range of 0.01% by mass or more and 5% by mass or less, more preferably in the range of 0.05% by mass or more and 3% by mass or less on the basis of the total mass of the protective layer 3 and the intermediate layer 4.

The intermediate layer 4 may also contain optional components such as microsilica and polyethylene wax in addition to the cured binder resin and a surfactant to be added as required.

There is no particular limitation with respect to the method for forming the intermediate layer 4, and the intermediate layer 4 can be formed by coating the protective layer 3 with a coating liquid for an intermediate layer prepared by dispersing or dissolving a thermoplastic resin, a curing agent, a surfactant to be added as required, and other optional components in an appropriate solvent.

There is no particular limitation with respect to the thickness of the intermediate layer 4, and the thickness is preferably in the range of 0.05 μm or more and 3 μm or less, more preferably in the range of 0.5 μm or more and 1.5 μm or less.

(Adhesive Layer)

As shown in FIG. 1, an adhesive layer 5 is provided on the intermediate layer 4. The adhesive layer 5 is a layer constituting the transfer layer 10 and used for allowing transfer layer 10 to adhere onto a transfer receiving article when the transfer layer 10 is transferred onto the transfer receiving article. Accordingly, in the transfer film 100 of one embodiment, the adhesive layer 5 is a layer located on the outermost surface.

The adhesive layer 5 may also has a function as a receiving layer capable of receiving the dye of a dye layer. In the case where the adhesive layer 5 has a function of the receiving layer, a print can be obtained by forming a thermally transferable image on the adhesive layer 5 located on the outermost surface of the transfer film 100 of one embodiment by means of a thermal transfer sheet comprising a dye layer and transferring the transfer layer 10 comprising the adhesive layer 5 where the thermally transferable image has been formed onto the transfer receiving article.

There is no particular limitation with respect to materials of the adhesive layer 5, and materials having an adhesive property can be appropriately selected and used. Examples of the material having an adhesive property can include ionomer resins, acid-modified polyolefin type resins, ethylene-(meth) acrylic acid copolymers, ethylene-(meth) acrylic acid ester copolymers, polyester type resins, polyamide type resins, vinyl type resins, (meth) acryl type resins such as acryl type and methacryl type, acrylic acid ester type resins, maleic acid resins, butyral type resins, alkyd resins, polyethylene oxide resins, phenol type resins, urea resins, melamine resins, melamine-alkyd resins, cellulose type resins, polyurethane type resins, polyvinyl ether resins, silicone resins, and rubber type resins. The adhesive layer 5 may contain one material solely or may contain two or more materials. Among the materials exemplified above, vinyl type resins, acryl type resins, butyral type resins, and polyester type resins having a high adhesive property are preferred. Vinyl type resins, acryl type resins, ethylene-(meth) ethyl acrylate copolymers, and acrylic acid ester copolymers are more preferable. Additionally, in the case where the adhesive layer serves a function as a receiving layer, it is possible to use conventionally-known resin materials that easily receive thermally-transferable colorants such as subliming dyes or thermally-fusible inks. Examples include polyolefin type resins such as polypropylene, halogenated resins such as polyvinyl chloride or polyvinylidene chloride, vinyl type resins such as polyvinyl acetate, vinyl chloride-vinyl acetate copolymers, ethylene-vinyl acetate copolymers, or polyacrylic acid esters, polyester resins such as polyethylene terephthalate or polybutylene terephthalate, polystyrene type resins, polyamide type resins, copolymer type resins of an olefin such as ethylene or propylene and other vinyl polymer, cellulose type resins such as ionomers or cellulose diastase, and polycarbonate. Among these, vinyl chloride-vinyl acetate type polymers or polyvinyl chloride resins are preferable, and vinyl chloride-vinyl acetate type polymers are particularly preferable.

There is no particular limitation with respect to the thickness of the adhesive layer, and the thickness is preferably in the range of 0.1 μm or more and 10 μm or less, more preferably in the range of 0.3 μm or more and 3 μm or less.

The adhesive layer can be formed by dissolving or dispersing a single material or a plurality of materials selected from the above-mentioned materials and various additives to be added as required into an appropriate solvent such as water or an organic solvent to prepare a coating liquid for an adhesive layer, applying the liquid by a procedure such as a gravure printing method, a screen printing method, or a reverse-coating method using a gravure plate, and drying the applied liquid.

Alternatively, a receiving layer may be further provided between the adhesive layer 5 and the intermediate layer 4 (not shown). The thickness of the receiving layer is preferably in the range of 0.5 μm or more and 10 μm or less, more preferably in the range of 1 μm or more and 3 μm or less.

(Release Layer)

A release layer 2 may be also provided between the substrate 1 and the transfer layer 10. The release layer 2 is an optional constituent in the transfer film 100 of one embodiment and a layer not to be included in the transfer layer 10. That is, the release layer 2 is a layer that remains on the side of the substrate 1 when the transfer layer 10 is transferred onto a transfer receiving article.

Examples of the resin to be used in the release layer can include waxes, silicone wax, silicone resins, various silicone-modified resins such as silicone-modified acryl resins, fluorine resins, fluorine-modified resins, polyvinyl alcohol, acryl resins, thermally crosslinkable epoxy-amino resins and thermally crosslinkable alkyd-amino resins, melamine type resins, cellulose type resins, urea type resins, polyolefin type resins, acryl type resins, and cellulosic resins. The release layer 2 may contain one resin solely or may contain two or more resins. Alternatively, the release layer 2 may be formed by using a cross-linking agent such as an isocyanate compound, and a catalyst such as a tin-based catalyst and an aluminum-based catalyst, in addition to the resin having releasability.

There is no particular limitation with respect to the thickness of the release layer, and the thickness is preferably in the range of 0.1 μm or more and 5 μm or less, more preferably in the range of 0.5 μm or more and 2 μm or less.

There is also no particular limitation with respect to the method for forming the release layer 2, and the release layer 2 can be formed by applying a coating liquid for a release layer prepared by dispersing or dissolving the resin exemplified above into an appropriate solvent by a known coating method such as roll coating and gravure coating, drying the coated layer, and baking the layer at a temperature of the order of 150° C. or more and 200° C. or less.

Alternatively, on the surface opposite to the surface of the substrate 1 on which the transfer layer 10 is provided, a back face layer (not shown) for the purpose of improving the thermal resistance, driving stability, and the like can be provided. Incidentally, the back face layer is an optional constituent in the transfer film 100 of one embodiment.

The back face layer may be formed by appropriately selecting a conventionally-known thermoplastic resin and the like. Examples of the thermoplastic resin like this can include thermoplastic resins, such as polyester type resins, polyacrylic acid ester type resins, polyvinyl acetate type resins, styrene acrylate type resins, polyurethane type resins, polyolefin type resins such as polyethylene type resins and polypropylene type resins, polystyrene type resins, polyvinyl chloride type resins, polyether type resins, polyamide type resins, polyimide type resins, polyamide imide type resins, polycarbonate type resins, polyacrylamide resins, polyvinyl chloride resins, polyvinyl butyral resins, polyvinyl acetoacetal resins, and polyvinyl acetal resins, and silicone modified forms of these.

Further, the back face layer preferably contains various additives for the purpose of improving the slipping property, such as a release agent such as waxes, higher fatty acid amides, phosphoric ester compounds, metal soaps, silicone oils, and surfactants, an organic powder such as a fluorine resin, and inorganic particles such as silica, clay, talc, and calcium carbonate, and particularly preferably contains at least one of the phosphoric ester and metal soap.

The back face layer can be formed, for example, by dispersing or dissolving the above-mentioned thermoplastic resin and various additives to be added as required into an appropriate solvent to prepare a coating liquid, coating the substrate 1 with the coating liquid by a known procedure such as the gravure printing method, the screen printing method, or the reverse roll coating printing method using a gravure plate, and drying the coated layer. The thickness of the back face layer is preferably in the range of 0.1 μm or more and 5 μm or less, more preferably in the range of 0.3 μm or more and 2.0 μm or less, from the viewpoint of an improvement in the heat resistance or the like.

<Transfer of Transfer Layer>

The method for transferring the transfer layer 10 onto a transfer receiving article by using the transfer film 100 of one embodiment may be a known transfer method. For example, known methods such as hot stamping by heat inscription (foil pressing), entire surface or stripe transfer by heat rolling, and a thermal printer (also referred to as a thermal transfer printer) by use of a thermal head (heat-sensitive printing head) can be applied.

As the transfer receiving article, there is no particular limitation in applications as long as they require durability such as abrasion resistance and plasticizer resistance. The transfer receiving article may be, for example, any of natural fiber paper, coated paper, tracing paper, plastic films which are not deformed upon exposure to heat at the time of transfer, glasses, metals, ceramics, woods, cloths, dye-receptive media, and the like. Additionally, from IC cards and the like, designability and a security property are usually required, and thus, in the case where the transfer film 100 of one embodiment comprises no receiving layer, a print layer, a hologram layer or the like is generally provided on the surface of a transfer receiving article onto which the transfer layer 10 is to be transferred.

EXAMPLES

Hereinbelow, the present invention will be described in further detail with reference to Examples, but the present invention is not intended to be limited to these Examples. Unless otherwise specified below, the part is based on the mass.

Example 1

A film coated with a release layer of a melamine type resin onto one surface of a polyethylene terephthalate (PET) film having a thickness of 12 μm was used as the substrate. The release layer was coated with a coating liquid for a protective layer 1 having the following composition by gravure coating so as to achieve a thickness of 6 μm after drying and dried. Then the dried layer was irradiated with ultraviolet rays by using an UV exposure apparatus (Fusion UV, F600V, LH10 lamp, H valve, cold type reflective mirror) to form a protective layer. Subsequently, the protective layer was coated with a coating liquid for an intermediate layer 1 having the following composition by gravure coating so as to achieve a thickness of 1 μm after drying and dried to form an intermediate layer. Subsequently, the intermediate layer was coated with a coating liquid for a layer functioned both as a receiving layer and an adhesive layer having the following composition by gravure coating so as to achieve a thickness of 2 μm after drying and dried to form a layer functioned both as a receiving layer and an adhesive layer. When a laminate in which the protective layer, the intermediate layer, and the layer functioned both as a receiving layer and an adhesive layer were layered in this order from the side of the substrate was used as the transfer layer, the transfer film of Example 1 was obtained in which the substrate, the release layer, and the transfer layer were layered in this order.

| <Coating liquid for protective layer 1> | |
|---|---|
| Polyfunctional acrylate (NK Ester A-9300, Shin Nakamura Chemical Co., Ltd.) | 40 parts |
| Urethane acrylate (NK Oligomer UA122-P, bifunctional, Shin Nakamura Chemical Co., Ltd.) | 25 parts |
| Urethane acrylate (NK Ester U-15HA, pentakaidecafunctional, Shin Nakamura Chemical Co., Ltd.) | 30 parts |
| Photopolymerization initiator (IRGACURE (R) 907, BASF Japan Ltd.) | 5 parts |

-continued

<Coating liquid for protective layer 1>

| | |
|---|---|
| Filler<br>(MEK-AC2140, volume-average particle size<br>12 nm, Nissan Chemical Industries, Ltd.) | 5 parts |
| Surfactant (acryl type surfactant)<br>(LF-1984, Kusumoto Chemicals, Ltd.) | 0.1 parts |
| Toluene | 200 parts |
| Methyl ethyl ketone | 200 parts |

<Coating liquid for intermediate layer 1>

| | |
|---|---|
| Polyester resin<br>(Vylon (R) 200, TOYOBO CO., LTD.) | 3.3 parts |
| Vinyl chloride-vinyl acetate copolymer<br>(SOLBIN (R) CNL, Nissin Chemical<br>Industry Co., Ltd.) | 2.7 parts |
| Isocyanate curing agent<br>(XEL curing agent, DIC Graphics<br>Corporation) | 1.5 parts |
| Methyl ethyl ketone | 6.7 parts |
| Toluene | 3.3 parts |

<Coating liquid for layer functioned both as receiving layer and adhesive layer>

| | |
|---|---|
| Vinyl chloride-vinyl acetate copolymer<br>(SOLBIN (R) CNL, Nissin Chemical<br>Industry Co., Ltd.) | 95 parts |
| Epoxy-modified silicone oil<br>(KP-1800U, Shin-Etsu Chemical Co., Ltd.) | 5 parts |
| Toluene | 200 parts |
| Methyl ethyl ketone | 200 parts |

Example 2

The transfer film of Example 2 was obtained totally in the same manner as in Example 1 except that the coating liquid for a protective layer 1 was replaced by a coating liquid for a protective layer 2 having the following composition.

<Coating liquid for protective layer 2>

| | |
|---|---|
| Polyfunctional acrylate<br>(NK Ester A-9300, Shin Nakamura Chemical<br>Co., Ltd.) | 40 parts |
| Urethane acrylate<br>(NK Oligomer UA122-P, bifunctional, Shin<br>Nakamura Chemical Co., Ltd.) | 25 parts |
| Urethane acrylate<br>(NK Ester U-15HA, pentakaidecafunctional,<br>Shin Nakamura Chemical Co., Ltd.) | 30 parts |
| Photopolymerization initiator<br>(IRGACURE (R) 907, BASF Japan Ltd.) | 5 parts |
| Filler<br>(MEK-AC2140, volume-average particle size<br>12 nm, Nissan Chemical Industries, Ltd.) | 5 parts |
| Surfactant (acryl type surfactant<br>(LF-1984, Kusumoto Chemicals, Ltd.) | 1 part |
| Toluene | 200 parts |
| Methyl ethyl ketone | 200 parts |

Example 3

The transfer film of Example 3 was obtained totally in the same manner as in Example 1 except that a coating liquid for a protective layer 3 prepared by replacing 0.1 parts of the surfactant (acryl type surfactant) (LF-1984, Kusumoto Chemicals, Ltd.) of the coating liquid for a protective layer 1 by 0.1 parts of a surfactant (silicone type surfactant) (1761, Kusumoto Chemicals, Ltd.) was used instead of the coating liquid for a protective layer 1 to form the protective layer.

Example 4

The transfer film of Example 4 was obtained totally in the same manner as in Example 1 except that a coating liquid for a protective layer 4 prepared by replacing 1 part of the surfactant (acryl type surfactant) (LF-1984, Kusumoto Chemicals, Ltd.) of the coating liquid for a protective layer 2 by 1 part of a surfactant (silicone type surfactant) (1761, Kusumoto Chemicals, Ltd.) was used instead of the coating liquid for a protective layer 1 to form the protective layer.

Example 5

The transfer film of Example 5 was obtained totally in the same manner as in Example 1 except that a coating liquid for a protective layer 5 prepared by replacing 0.1 parts of the surfactant (acryl type surfactant) (LF-1984, Kusumoto Chemicals, Ltd.) of the coating liquid for a protective layer 1 by 0.1 parts of a surfactant (silicone type surfactant) (1711EF, Kusumoto Chemicals, Ltd.) was used instead of the coating liquid for a protective layer 1 to form the protective layer.

Example 6

The transfer film of Example 6 was obtained totally in the same manner as in Example 1 except that a coating liquid for a protective layer 6 prepared by replacing 1 part of the surfactant (acryl type surfactant) (LF-1984, Kusumoto Chemicals, Ltd.) of the coating liquid for a protective layer 2 by 1 part of a surfactant (silicone type surfactant) (1711EF, Kusumoto Chemicals, Ltd.) was used instead of the coating liquid for a protective layer 1 to form the protective layer.

Example 7

The transfer film of Example 7 was obtained totally in the same manner as in Example 1 except that a coating liquid for a protective layer 7 prepared by replacing 0.1 parts of the surfactant (acryl type surfactant) (LF-1984, Kusumoto Chemicals, Ltd.) of the coating liquid for a protective layer 1 by 0.1 parts of a surfactant (vinyl type surfactant) (LHP-91, Kusumoto Chemicals, Ltd.) was used instead of the coating liquid for a protective layer 1 to form the protective layer.

Example 8

The transfer film of Example 8 was obtained totally in the same manner as in Example 1 except that a coating liquid for a protective layer 8 prepared by replacing 1 part of the surfactant (acryl type surfactant) (LF-1984, Kusumoto Chemicals, Ltd.) of the coating liquid for a protective layer 2 by 1 part of a surfactant (vinyl type surfactant) (LHP-91, Kusumoto Chemicals, Ltd.) was used instead of the coating liquid for a protective layer 1 to form the protective layer.

Example 9

The transfer film of Example 9 was obtained totally in the same manner as in Example 1 except that a coating liquid for a protective layer 9 prepared by replacing 0.1 parts of the surfactant (acryl type surfactant) (LF-1984, Kusumoto Chemicals, Ltd.) of the coating liquid for a protective layer 1 by 0.1 parts of a surfactant (vinyl type surfactant) (LHP-90, Kusumoto Chemicals, Ltd.) was used instead of the coating liquid for a protective layer 1 to form the protective layer.

Example 10

The transfer film of Example 10 was obtained totally in the same manner as in Example 1 except that a coating liquid for a protective layer 10 prepared by replacing 0.1 parts of the surfactant (acryl type surfactant) (LF-1984, Kusumoto Chemicals, Ltd.) of the coating liquid for a protective layer 1 by 0.1 parts of a surfactant (nonionic surfactant) (F563, DIC Corporation) was used instead of the coating liquid for a protective layer 1 to form the protective layer.

Example 11

The transfer film of Example 11 was obtained totally in the same manner as in Example 1 except that the coating liquid for a protective layer 1 was replaced by a coating liquid for a protective layer 11 having the following composition and that the coating liquid for an intermediate layer was replaced by a coating liquid for an intermediate layer 2 having the following composition.

| <Coating liquid for protective layer 11> | |
|---|---|
| Polyfunctional acrylate (NK Ester A-9300, Shin Nakamura Chemical Co., Ltd.) | 40 parts |
| Urethane acrylate (NK Oligomer UA122-P, bifunctional, Shin Nakamura Chemical Co., Ltd.) | 25 parts |
| Urethane acrylate (NK Ester U-15H, pentakaidecafunctional, Shin Nakamura Chemical Co., Ltd.) | 30 parts |
| Photopolymerization initiator (IRGACURE (R) 907, BASF Japan Ltd.) | 5 parts |
| Filler (MEK-AC2140, volume-average particle size 12 nm, Nissan Chemical Industries, Ltd.) | 5 parts |
| Toluene | 200 parts |
| Methyl ethyl ketone | 200 parts |

| <Coating liquid for intermediate layer 2> | |
|---|---|
| Polyester resin (Vylon (R) 200, TOYOBO CO., LTD.) | 3.3 parts |
| Vinyl chloride-vinyl acetate copolymer (SOLBIN (R) CNL, Nissin Chemical Industry Co., Ltd.) | 2.7 parts |
| Isocyanate curing agent (XEL curing agent, DIC Graphics Corporation) | 1.5 parts |
| Surfactant (acryl type surfactant) (LF-1984, Kusumoto Chemicals, Ltd.) | 0.1 parts |
| Methyl ethyl ketone | 6.7 parts |
| Toluene | 3.3 parts |

Example 12

The transfer film of Example 12 was obtained totally in the same manner as in Example 1 except that the coating liquid for a protective layer 1 was replaced by a coating liquid for a protective layer 11 having the above composition to form the protective layer and that a coating liquid for an intermediate layer 3 prepared by replacing 0.1 parts of the surfactant (acryl type surfactant) (LF-1984, Kusumoto Chemicals, Ltd.) of the coating liquid for an intermediate layer 2 by 0.1 parts of a surfactant (silicone type surfactant) (1711EF, Kusumoto Chemicals, Ltd.) was used instead of the coating liquid for an intermediate layer 1 to form the intermediate layer.

Example 13

The transfer film of Example 13 was obtained totally in the same manner as in Example 1 except that coating liquid for a protective layer 1 was replaced by a coating liquid for a protective layer 11 having the above composition to form the protective layer and that a coating liquid for an intermediate layer 4 prepared by replacing 0.1 parts of the surfactant (acryl type surfactant) (LF-1984, Kusumoto Chemicals, Ltd.) of the coating liquid for an intermediate layer 2 by 0.1 parts of a surfactant (vinyl type surfactant) (LHP-91, Kusumoto Chemicals, Ltd.) was used instead of the coating liquid for an intermediate layer 1 to form the intermediate layer.

Example 14

The transfer film of Example 14 was obtained totally in the same manner as in Example 1 except that the coating liquid for a protective layer 1 was replaced by a coating liquid for a protective layer 12 having the following composition to form the protective layer and that the coating liquid for an intermediate layer 1 was replaced by the coating liquid for an intermediate layer 2 having the above composition to form the intermediate layer.

| <Coating liquid for protective layer 12> | |
|---|---|
| Polyfunctional acrylate (NK Ester A-9300, Shin Nakamura Chemical Co., Ltd.) | 40 parts |
| Urethane acrylate (NK Oligomer UA122-P, bifunctional, Shin Nakamura Chemical Co., Ltd.) | 25 parts |
| Urethane acrylate (NK Ester U-15HA, pentakaidecafunctional, Shin Nakamura Chemical Co., Ltd.) | 30 parts |
| Photopolymerization initiator (IRGACURE (R) 907, BASF Japan Ltd.) | 5 parts |
| Filler (MEK-AC2140, volume-average particle size 12 nm, Nissan Chemical Industries, Ltd.) | 5 parts |
| Surfactant (acryl type surfactant) (LF-1984, Kusumoto Chemicals, Ltd.) | 0.1 parts |
| Surfactant (silicone type surfactant) (1761 Kusumoto Chemicals, Ltd.) | 0.1 parts |
| Toluene | 200 parts |
| Methyl ethyl ketone | 200 parts |

Example 15

The transfer film of Example 15 was obtained totally in the same manner as in Example 1 except that the coating liquid for a protective layer 1 was replaced by a coating liquid for a protective layer 13 having the following composition to form the protective layer and that the coating liquid for an intermediate layer 1 was replaced by the coating liquid for an intermediate layer 2 having the above composition to form the intermediate layer.

| <Coating liquid for protective layer 13> | |
|---|---|
| Polyfunctional acrylate (NK Ester A-9300, Shin Nakamura Chemical Co., Ltd.) | 40 parts |
| Urethane acrylate (NK Oligomer UA122-P, bifunctional, Shin Nakamura Chemical Co., Ltd.) | 25 parts |
| Urethane acrylate (NK Ester U-15HA, pentakaidecafunctional, Shin Nakamura Chemical Co., Ltd.) | 30 parts |
| Photopolymerization initiator (IRGACURE (R) 907, BASF Japan Ltd.) | 5 parts |
| Filler (MEK-AC2140, volume-average particle size 12 nm, Nissan Chemical Industries, Ltd.) | 5 parts |
| Surfactant (acryl type surfactant) (LF-1984, Kusumoto Chemicals, Ltd.) | 1 part |
| Surfactant (silicone type surfactant) (1761 Kusumoto Chemicals, Ltd.) | 0.1 parts |
| Toluene | 200 parts |
| Methyl ethyl ketone | 200 parts |

Example 16

The transfer film of Example 16 was obtained totally in the same manner as in Example 1 except that the coating liquid for an intermediate layer 1 was replaced by a coating liquid for an intermediate layer 5 having the following composition to form the intermediate layer.

| <Coating liquid for intermediate layer 5> | |
|---|---|
| Polyvinyl alcohol (solid content 100%, degree of polymerization 1700) (KURARAY POVAL (R) PVA-117, KURARAY CO., LTD.) | 2.67 parts |
| Titanium chelating agent (as the curing agent) (solid content 42%) (Orgatics (R) TC-300, Matsumoto Fine Chemical Co., Ltd.) | 2.55 parts |
| Water | 45.89 parts |
| Denatured ethanol | 45.89 parts |

Example 17

The transfer film of Example 17 was obtained totally in the same manner as in Example 1 except that a coating liquid for a protective layer 14 prepared by replacing 0.1 parts of the surfactant (acryl type surfactant) (LF-1984, Kusumoto Chemicals, Ltd.) of the coating liquid for a protective layer 1 by 0.01 parts of a surfactant (silicone type surfactant) (1761, Kusumoto Chemicals, Ltd.) was used instead of the coating liquid for a protective layer 1 to form the protective layer.

Comparative Example 1

The transfer film of Comparative Example 1 was obtained totally in the same manner as in Example 1 except that the coating liquid for a protective layer 1 was replaced by a coating liquid for a protective layer A having the following composition to form the protective layer.

| <Coating liquid for protective layer A> | |
|---|---|
| Polyfunctional acrylate (NK Ester A-9300, Shin Nakamura Chemical Co., Ltd.) | 40 parts |
| Urethane acrylate (NK Oligomer UA122-P, bifunctional, Shin Nakamura Chemical Co., Ltd.) | 25 parts |
| Urethane acrylate (NK Ester U-15HA, pentakaidecafunctional, Shin Nakamura Chemical Co., Ltd.) | 30 parts |
| Photopolymerization initiator (IRGACURE (R) 907, BASF Japan Ltd.) | 5 parts |
| Filler (MEK-AC2140, volume-average particle size 12 nm, Nissan Chemical Industries, Ltd.) | 5 parts |
| Toluene | 200 parts |
| Methyl ethyl ketone | 200 parts |

<Surface Quality Evaluation>

Upon forming the transfer film of each of Examples and Comparative Example, the quality of the coated surface when the protective layer was overcoated with the coating liquid for an intermediate layer was visually checked, and surface quality evaluation was carried out based on the following evaluation criteria. Evaluation results are shown in Table 1. Incidentally, surface quality evaluation was carried out on an area of 10 cm×10 cm of arbitrary coated surfaces.

"Evaluation Criteria"
A: No repelling of the intermediate layer occurs.
B: Repelling of 0.5 mm or less occurs.
C: Repelling of more than 0.5 mm and 1 mm or less occurs.
NG: Repelling of more than 1 mm occurs.

(Transfer of Transfer Layer (Formation of Print))
A thermally transferable image was formed on the transfer layer of the transfer film of each of Examples and Comparative Example (on a layer functioned both as an adhesive layer and a receiving layer) by using a thermal transfer ribbon for a FARGO HDP-5000 printer (HID Global. Corporation). Subsequently, the transfer layer of the transfer film of each of Examples and Comparative Example on which the thermally transferable image had been formed was transferred onto a card substrate having the following composition by using a FARGO HDP-5000 (HID Global Corporation) printer under conditions including the surface temperature of the heat roller: 175° C. and the speed: 2.3 sec/inch to thereby obtain a print of each of Examples and Comparative Example.

| <Composition of card substrate> | |
|---|---|
| Polyvinyl chloride compound (degree of polymerization 800) (containing 10% additives such as a stabilizer) | 100 parts |
| White pigment (titanium oxide) | 10 parts |
| Plasticizer (dioctyl phthalate) | 0.5 parts |

(Transferability Evaluation)
Transfer of the transfer layer onto a card substrate was carried out consecutively for 10 sheets of the transfer film of each of Examples and Comparative Example. The transfer ratio of each transfer layer onto each card substrate was checked, and the average transfer ratio of 10 sheets was calculated. Then, transferability evaluation was carried out based on the following evaluation criteria. Evaluation results are shown in Table 1. Incidentally, the transfer ratio means a value of Area of the region of the transfer layer actually transferred/Area of the region of the transfer layer to be transferred converted into a percentage. A transfer ratio closer to 100% indicates more satisfactory transferability of the transfer layer.

"Evaluation Criteria"

A: The transfer ratio is 95% or more and 100% or less.
B: The transfer ratio is 50% or more and less than 95%.
NG: The transfer ratio is less than 50%.

(Surface Strength Evaluation)

Abrasion resistance test (Taber test) of the print of each of Examples and Comparative Example obtained by transfer of the transfer layer described above was carried out in compliance with ANSI-INCITS322-2002, 5.9 Surface Abrasion for 3500 cycles. The condition of the surface of the print of each of Examples and Comparative Example was visually checked every 250 cycles, and surface strength evaluation was carried out based on the following evaluation criteria. Evaluation results are shown in Table 1. Additionally, upon carrying out surface strength evaluation, the abrasion wheel (abrasion wheel: CS-10F, load: 500 gf) was ground every 250 cycles.

"Evaluation Criteria"

A: The surface condition after 3500 cycles have been carried out is satisfactory.
B: The surface condition after 3250 cycles have been carried out is satisfactory, but the surface condition after 3500 cycles have been carried out is not satisfactory.
C: The surface condition after 3000 cycles have been carried out is satisfactory, but the surface condition after 3250 cycles have been carried out is not satisfactory.
NG: The surface condition after 3000 cycles have been carried out is not satisfactory.

(Plasticizer Resistance Evaluation)

A plasticizer-containing soft vinyl chloride sheet (Altron® #480, thickness 400 μm, Mitsubishi Chemical Corporation) and the print of each of Examples and Comparative Example obtained above were superposed on each other such that the transfer layer in the print was opposed to the plasticizer-containing soft vinyl chloride sheet. The laminate was preserved under a load of 40 g/cm$^2$ at 50° C. for 60 hours. The degree of degradation of the image due to the plasticizer was visually checked, and plasticizer resistance evaluation was carried out based on the following evaluation criteria. Evaluation results are shown in Table 1.

"Evaluation Criteria"

A: The image has no influence from the plasticizer and has a satisfactory appearance.
B: The image is influenced from the plasticizer and slightly blurred, but, practically, it is not at a level that becomes a problem.
C: The image is influenced from the plasticizer, and blurring to be a practical hindrance is caused.
NG: The image disappeared.

TABLE 1

| | Surface quality evaluation | Transferability evaluation | Surface strength evaluation | Plasticizer resistance evaluation |
| --- | --- | --- | --- | --- |
| Example 1 | B | A | B | A |
| Example 2 | A | A | A | A |
| Example 3 | B | A | B | A |
| Example 4 | B | A | C | A |
| Example 5 | B | A | B | A |
| Example 6 | B | A | C | A |
| Example 7 | B | A | B | A |

TABLE 1-continued

| | Surface quality evaluation | Transferability evaluation | Surface strength evaluation | Plasticizer resistance evaluation |
| --- | --- | --- | --- | --- |
| Example 8 | B | A | B | A |
| Example 9 | B | A | B | A |
| Example 10 | C | A | B | A |
| Example 11 | C | A | A | A |
| Example 12 | C | A | C | A |
| Example 13 | B | A | B | A |
| Example 14 | C | A | B | A |
| Example 15 | B | A | B | A |
| Example 16 | B | A | B | A |
| Example 17 | C | A | B | A |
| Comparative Example 1 | NG | A | B | A |

In each of Examples, for the purpose of improving the foil cutting property of the transfer layer, the coating liquid for a protective layer for forming the transfer film of each of Examples is allowed to contain a filler as an optional component. However, even in the case where the filler is not contained in each coating liquid for a protective layer, results similar to results shown in Table 1 above have been confirmed.

REFERENCE SIGNS LIST

100 transfer film
1 substrate
2 release layer
3 protective layer
4 intermediate layer
5 adhesive layer
10 transfer layer

The invention claimed is:

1. A transfer film comprising a transfer layer provided on a substrate,
    wherein the transfer layer has a layered structure in which a protective layer, an intermediate layer, and an adhesive layer are layered, in this order, from the side of the substrate,
    wherein the protective layer contains an active ray-cured resin, formed by curing an active ray-curable resin by an active ray, and an acryl type surfactant, and
    wherein the intermediate layer contains a cured binder resin, which is a cured product of a binder resin and a curing agent.

2. The transfer film according to claim 1, wherein and the intermediate layer also contains a surfactant.

3. The transfer film according to claim 1, wherein a release layer is provided between the substrate and the transfer layer.

4. The transfer film according to claim 1, wherein the cured binder resin contained in the intermediate layer is a cured product of a binder resin and an isocyanate type compound.

5. The transfer film according to claim 1, wherein the protective layer contains a filler having a volume-average particle size of 1 nm or more and 200 nm or less.

6. The transfer film according to claim 1, wherein the adhesive layer is an adhesive layer having a function of a receiving layer.

7. The transfer film according to claim 2, wherein the surfactant of the intermediate layer is an acryl type surfactant.

* * * * *